(12) United States Patent
Kasai et al.

(10) Patent No.: US 7,393,377 B2
(45) Date of Patent: Jul. 1, 2008

(54) HONEYCOMB FILTER AND EXHAUST GAS TREATMENT APPARATUS

(75) Inventors: Yoshiyuki Kasai, Kasugai (JP); Tatsuyuki Kuki, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 472 days.

(21) Appl. No.: 11/065,133

(22) Filed: Feb. 24, 2005

(65) Prior Publication Data

US 2005/0191461 A1    Sep. 1, 2005

(30) Foreign Application Priority Data

Feb. 26, 2004    (JP) ............... 2004-051635

(51) Int. Cl.
*B01D 46/00*    (2006.01)
*F01N 3/022*    (2006.01)

(52) U.S. Cl. .................. 55/523; 55/282.2; 55/282.3; 55/385.3; 55/523; 55/524; 55/DIG. 10; 55/DIG. 30; 60/311; 428/116

(58) Field of Classification Search ............... 55/282.2, 55/282.3, 385.3, 523, 524, DIG. 10, DIG. 30; 60/297, 299, 300, 303, 311; 428/116, 117, 428/118

See application file for complete search history.

(56) References Cited

U.S. PATENT DOCUMENTS

| | | | |
|---|---|---|---|
| 4,276,071 A * | 6/1981 | Outland .................. | 55/523 |
| 4,335,023 A | 6/1982 | Dettling et al. | |
| 4,416,676 A * | 11/1983 | Montierth .................. | 55/523 |
| 4,643,749 A * | 2/1987 | Miura .................. | 55/523 |
| 5,914,187 A * | 6/1999 | Naruse et al. .................. | 55/523 |
| 6,843,822 B2 * | 1/2005 | Beall et al. .................. | 55/523 |
| D505,194 S * | 5/2005 | Komori et al. ............. | D23/365 |
| 7,247,184 B2 * | 7/2007 | Frost .................. | 55/523 |
| 2003/0044572 A1 | 3/2003 | Beall et al. | |

FOREIGN PATENT DOCUMENTS

| | | | |
|---|---|---|---|
| EP | 1 514 588 A1 | | 3/2005 |
| FR | 2 789 327 | * | 8/2000 |
| FR | 2 789 327 A1 | | 8/2000 |
| WO | WO 2004/113252 A1 | | 12/2004 |
| WO | WO 2005/030365 A1 | | 4/2005 |

* cited by examiner

*Primary Examiner*—Jason M. Greene
(74) *Attorney, Agent, or Firm*—Oliff & Berridge, PLC

(57) ABSTRACT

In a honeycomb filter in which a plurality of cells are formed by porous partition walls, and a predetermined cell whose one end portion is plugged, and a remaining cell whose other end portion is plugged are alternately arranged in such a manner as to form checked patterns in the opposite end portions. In a section of the filter, a sectional area of the predetermined cell is different from that of the remaining cell, a value of a ratio of a channel hydraulic diameter of the cell having a large sectional area to that of the cell having a small sectional area is 1.2 or more, at least a sectional shape of the cell having the large sectional area is a quadrangular shape whose portion corresponding to at least one corner portion is circular, and a value of a ratio of minimum thickness of a portion (intersection portion) in which the partition walls cross one another to a thickness of each partition wall 2 is 0.7 or more and less than 1.3. The honeycomb filter is capable of inhibiting a fluid inflow-side end face (opening of an inflow-side cell) from being closed by particulates and the like, and maintaining high strength.

6 Claims, 2 Drawing Sheets

US 7,393,377 B2

HONEYCOMB FILTER AND EXHAUST GAS TREATMENT APPARATUS

BACKGROUND OF THE INVENTION

1. Field of the Invention

The present invention relates to a honeycomb filter and an exhaust gas treatment apparatus, further particularly to a honeycomb filter capable of inhibiting an end face on an inflow side of a fluid from being closed by particulates and the like and maintaining high strength, and an exhaust gas treatment apparatus having the honeycomb filter.

2. Description of the Related Art

There has been an increasing necessity for removing particulates or toxic substances from an exhaust gas of an internal combustion engine, boiler or the like in consideration of influences on environment. Especially, there has been a tendency that regulations on removal of particulate matters (hereinafter referred to also as "PM") discharged from a diesel engine have been strengthened worldwide, use of a honeycomb filter has been noted as a diesel particulate filter (hereinafter referred to also as "DPF") for removing the PM, and various systems have been proposed. The DPF usually has a structure in which a plurality of cells constituting fluid channels and having square sectional shapes are partitioned/formed by porous partition walls, and the porous partition walls constituting the cells perform functions of filters by alternately plugging the cells. Here, the sectional shape refers to the shape of the section obtained by cutting the cell with a flat face vertical to a longitudinal direction.

The DPF allows particulates-containing exhaust gas or the like to flow from one end portion, filters the particulates by the partition walls, and discharge purified gas from the other end portion. However, there has been a problem that the particulates contained in the exhaust gas are deposited in one end portion (end portion on an inflow side of the exhaust gas) with the inflow of the exhaust gas to thereby close the cells. This is a phenomenon that easily occurs in a case where the exhaust gas contains a large amount of particulates, or in cold districts. There has been a problem that when the cells are closed in this manner, a pressure loss in the DPF rapidly increases. To inhibit the cells from being closed, it has been proposed that sectional areas of cells (inflow-side cells) opened in the end portion on the inflow side of the exhaust gas are set to be different from those of cells (outflow-side cells) opened in the other end portion (end portion on the outflow side of the exhaust gas). Here, the sectional area refers to the area of the section at a time when the cell is cut with the flat face vertical to the longitudinal direction.

However, when the sectional area of the inflow-side cell of the honeycomb filter including the cells having square sectional shapes is set to be different from that of the outflow-side cell, each partition wall forming the cell partially thins and weakens in each portion (hereinafter referred to also as the "intersection portion") in which the partition walls cross one another. To solve this problem, post injection is performed when the PM is deposited on the DPF to thereby combust/remove the PM. However, in this case, there has been a problem that stress is concentrated on a part of the thinned intersection portion, and the part easily breaks. Here, the portion in which the partition walls cross one another refers to a portion belonging to both crossing partition walls in the section obtained by cutting the honeycomb filter with the flat face vertical to the longitudinal direction. For example, the portion refers to a square range of the intersection portion, when the partition walls linearly extending and having the equal thickness cross one another in the section.

Moreover, there has been a honeycomb filter having inflow-side cells having large sectional areas and outflow-side cells having small sectional areas, in which the sectional shape of the cell having the large sectional area is an octagonal shape obtained by linearly cutting a corner portion of the square shape (e.g., see French Patent Application Laid-Open No 2789327). This octagonal shape slightly solves the state in which the intersection portion partially thins, but a weakness problem still remains.

SUMMARY OF THE INVENTION

The present invention has been developed in consideration of the conventional technique problems, and an object thereof is to provide a honeycomb filter capable of inhibiting an end face (opening of an inflow-side cell) on an inflow side of a fluid from being closed by particulates and the like and maintaining high strength.

According to the present invention, there is provided a honeycomb filter comprising: porous partition walls which partition/form a plurality of cells constituting channels of a fluid, a predetermined cell whose one end portion is opened and whose other end portion is plugged, and a remaining cell whose one end portion is plugged and whose other end portion is opened, the predetermined cell and the remaining cell being alternately arranged, and the honeycomb filter being capable of allowing the fluid that has flowed in from the one end portion in which the predetermined cell opens to flow out as a passed fluid into the remaining cell through the partition walls, and discharging the passed fluid from the other end portion in which the remaining cell opens, wherein a sectional area of the predetermined cell is different from that of the remaining cell in a section cut with a flat face vertical to a longitudinal direction of the cell, a value of a ratio of a channel hydraulic diameter of the cell having a large sectional area to that of the cell having a small sectional area is 1.2 or more, at least a sectional shape of the cell having the large sectional area is a quadrangular shape whose portion corresponding to at least one corner portion is circular, and a value of a ratio of minimum thickness of a portion (intersection portion) in which the partition walls cross one another to a thickness of each partition wall is 0.7 or more and less than 1.3.

In the honeycomb filter of the present invention, it is preferable that the porous partition wall comprises a porous material composed of at least one selected from the group consisting of cordierite, silicon carbide, mullite, LAS, and alumina, as a main component. Further, in the honeycomb filter of the present invention, it is preferable that the partition wall carries catalyst.

According to the present invention, there is also provided an exhaust gas treatment apparatus comprising: a honeycomb filter comprising, porous partition walls which partition/form a plurality of cells constituting channels of a fluid, a predetermined cell whose one end portion is opened and whose other end portion is plugged, and a remaining cell whose one end portion is plugged and whose other end portion is opened, the predetermined cell and the remaining cell being alternately arranged, and the honeycomb filter being capable of allowing the fluid that has flowed in from the one end portion in which the predetermined cell opens to flow out as a passed fluid into the remaining cell through the partition walls, and discharging the passed fluid from the other end portion in which the remaining cell opens, wherein a sectional area of the predetermined cell is different from that of the remaining cell in a section cut along a flat face vertical to a longitudinal direction of the cell, a value of a ratio of a channel hydraulic diameter of the cell having a large sectional area to that of the cell having a small sectional area is 1.2 or more, at least a sectional shape of the cell having the large sectional area is a quadrangular shape whose portion corresponding to at least one corner portion is circular, and a value of a ratio of minimum thickness of a portion (intersection portion) in which the partition walls cross one another to a thickness of each partition wall is 0.7 or more and less than 1.3; and a holding portion for disposing the honeycomb filter in such a manner that exhaust gas flows in from the end portion on the side on which the cell having the large sectional area opens.

In the exhaust gas treatment apparatus of the present invention, it is preferable that the porous partition wall comprises a porous material composed of at least one selected from the group consisting of cordierite, silicon carbide, mullite, LAS, and alumina, as a main component. Additionally, in the exhaust gas treatment apparatus, it is preferable that the partition wall carries catalyst.

According to the honeycomb filter of the present invention, the sectional area of the predetermined cell is set to be different from that of the remaining cell (e.g., when the predetermined cell is "the cell having the large sectional area", the remaining cell is "the cell having the small sectional area"), and the value of the ratio of the channel hydraulic diameter of the cell having the large sectional area to that of the cell having the small sectional area in the predetermined cell or the remaining cell is set to 1.2 or more. Therefore, when the fluid is allowed to flow in from the end portion on the opening side of the cell having the large sectional area in the predetermined cell or the remaining cell, and particulates-containing exhaust gas is passed through the honeycomb filter, the cell opening in the end portion on the inflow side can be inhibited from being closed. The sectional shape of at least the cell having the large sectional area in the predetermined cell or the remaining cell is formed into the quadrangular shape whose portion corresponding to at least one corner portion is circular, and the value of the ratio of the minimum thickness of the portion (intersection portion) where the partition walls cross one another to the thickness of the partition wall is 0.7 or more and less than 1.3. Accordingly, even when the sectional area of the predetermined cell is different from that of the remaining cell, the thickness of the partition wall forming the cell can be prevented from being partially decreased in the portion (intersection portion) where the partition walls cross one another, and high strength can be maintained.

According to the exhaust gas treatment apparatus of the present invention, the exhaust gas flows in the honeycomb filter of the present invention from the end portion on the side on which the cell having the large sectional area opens. Therefore, in the honeycomb filter, the cell opening in the end portion on the inflow side of the fluid can be inhibited from being closed by the particulates or the like, and the high strength of the honeycomb filter can be maintained.

DESCRIPTION OF THE PREFERRED EMBODIMENT

An embodiment for carrying out the present invention will be concretely described hereinafter, but the present invention is not limited to the following embodiment, and it should be understood that design is appropriately modified, or improved based on usual knowledge of a person skilled in the art without departing from the scope of the present invention.

Figure 1:
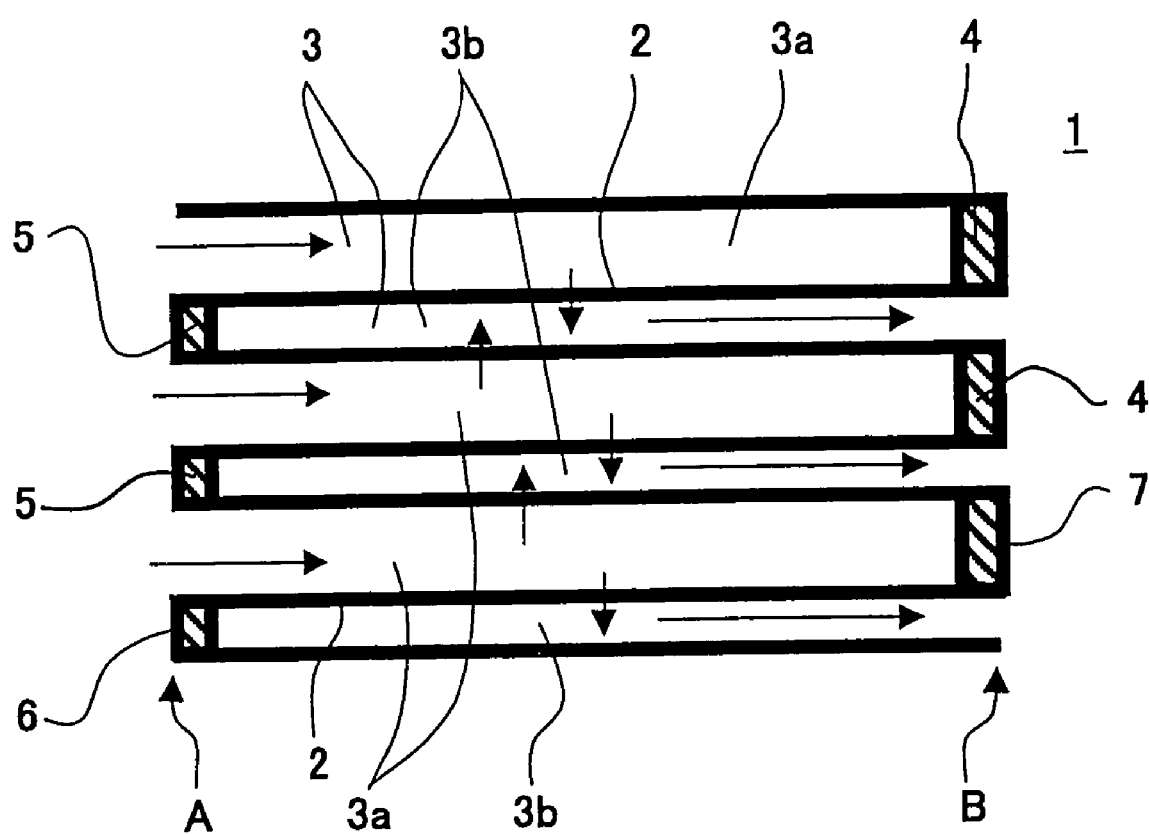
FIG. 1 is a sectional view schematically showing one embodiment of a honeycomb filter of the present invention, cut along a flat face including a center axis.

FIG. 1 is a sectional view schematically showing one embodiment of a honeycomb filter of the present invention, the honeycomb filter being cut with a flat face including a center axis. As shown in FIG. 1, a honeycomb filter 1 of the present embodiment comprises porous partition walls 2 which partition/form a plurality of cells 3 constituting channels of a fluid. Predetermined cells 3a whose one end portion A is opened and whose other end portion B is plugged by plugging portions 4, and remaining cells 3b whose one end portion A is plugged by plugging portions 5 and whose other end portion B is opened are alternately arranged in such a manner as to form a checkered pattern (see FIGS. 2(a), 2(b)) on the one end portion A side and the other end portion B side. A fluid which has flowed in from the one end portion A where the predetermined cells 3a open is passed through the partition walls 2, and discharged as passed fluid into the remaining cells 3b. The passed fluid can be discharged from the other end portion B in which the remaining cells 3b open. This is a wall flow type honeycomb filter. In FIG. 1, arrows show a state in which the fluid flows.

Moreover, in the honeycomb filter of the present embodiment, a sectional area of the predetermined cell 3a is set to be larger than that of the remaining cell 3b in a section cut with a flat face vertical to a longitudinal direction of the cell 3. A value of a ratio of a channel hydraulic diameter of the cell 3a having a large sectional area to that of the cell 3b having a small sectional area is 1.2 or more. The sectional shape of the predetermined cell 3a having the large sectional area is a quadrangular shape whose portions corresponding to four corner portions are circular. A value of a ratio of thickness of the partition wall to minimum thickness of a portion (intersection portion) where the partition walls cross one another is 0.7 or more and less than 1.3. Either the sectional area of the predetermined cell 3a or that of the remaining cell 3b may be larger. Moreover, at least the sectional shape of the cell having a larger sectional area is a quadrangular shape whose portion corresponding to the corner portion is circular. In the present embodiment, in the sectional shape of the predetermined cell 3a having the large sectional area, the portions corresponding to four corner portions are circular. In this case, the portion corresponding to at least one corner portion may be circular. The corner portions include a vertex and peripheral portions in a case where the sectional shape is a corresponding polygonal shape (polygonal shape formed by extending a linear portion). Here, a diameter of an inscribed circle of the cell is used as the channel hydraulic diameter.

Thus, according to the honeycomb filter of the present embodiment, the sectional area of the predetermined cell 3a is set to be different from that of the remaining cell 3b (the sectional area of the predetermined cell 3a is larger than that of the remaining cell 3b), and the value of the ratio of the channel hydraulic diameter of the predetermined cell 3a having the large sectional area to that of the remaining cell 3b having the small sectional area is set to 1.2 or more. The fluid is allowed to flow in from the end portion (one end portion) A on the side on which the predetermined cell 3a opens (the predetermined cell 3a having the large sectional area constitutes an inflow-side cell). Accordingly, when the particulates-containing exhaust gas is passed through the honeycomb filter 1, the predetermined cell 3a opening in the one end portion (end portion on the inflow side) A can be inhibited from being closed. The sectional shape of the predetermined cell 3a having the large sectional area is formed into the quadrangular shape whose portions corresponding to four corner portions are circular. The value of the ratio of the minimum thickness of the portion (intersection portion) where the partition walls 2 cross one another to the thickness of the partition wall 2 is 0.7 or more and less than 1.3. Accordingly, even when the sectional area of the predetermined cell 3a is increased, the thickness of the partition wall 2 forming the cell 3 can be prevented from being partially decreased in the portion (intersection portion) where the partition walls cross one another, and high strength can be maintained.

Figure 2A:
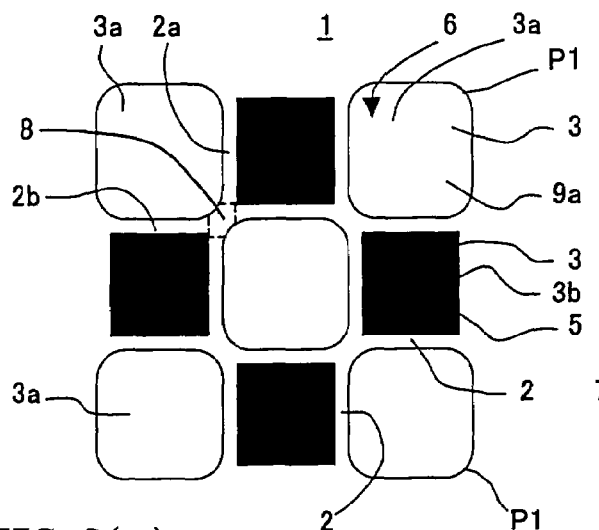
FIG. 2(a) is a plan view schematically showing one end face as viewed from one end portion side in one embodiment of the honeycomb filter of the present invention.
Figure 2B:
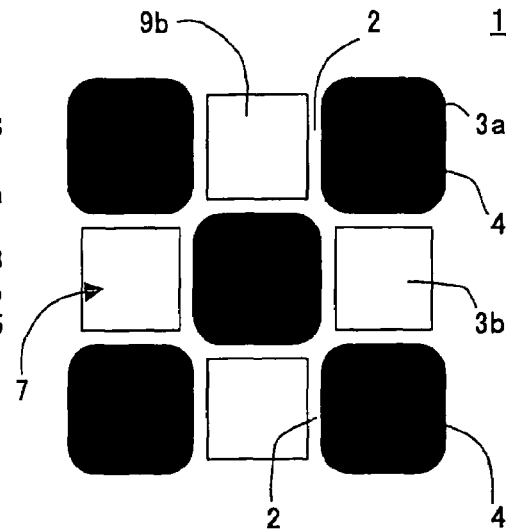
FIG. 2(b) is a plan view schematically showing the other end face as viewed from the other end portion side.

FIG. 2(a) is a plan view schematically showing one end face 6 of the honeycomb filter 1 as viewed from a one end portion A side, and FIG. 2(b) is a plan view schematically showing the other end face 7 as viewed from the other end portion B side.

As shown in FIGS. 2(a), 2(b), in the honeycomb filter 1 of the present embodiment, an opening 9a which is the opening of the predetermined cell 3a, and the plugging portion 5 are alternately arranged in the end face 6, and an opening 9b which is the opening of the remaining cell, and the plugging portion 4 are alternately arranged in the end face 7. A checkered pattern is formed in each end face. An area of the predetermined cell 3a in one end face 6 is larger than that of the remaining cell 3b in the end face 7, and the shape of the predetermined cell 3a in the end face 6 is a quadrangular whose portions P1 corresponding to four corner portions are circular.

In the end face 6 of the honeycomb filter 1 of the present embodiment, the minimum thickness of the portion (intersection portion) 8 where a partition wall 2a crosses a partition wall 2b is thickness of a portion in which a distance between two predetermined cells 3a disposed facing each other via the intersection portion 8 is minimum.

In the honeycomb filter 1 of the present embodiment shown in FIG. 2(a), the value of the ratio of the minimum thickness of the intersection portion 8 with respect to the thickness of the partition wall 2 is 0.7 or more and less than 1.3. It is preferable that the value of the ratio of the minimum thickness is 0.8 or more and less than 1.2. When the value is set to be smaller than 0.7, the strength of the honeycomb filter 1 decreases. When the value is set to 1.3 or more, a pressure loss in passing a fluid through the honeycomb filter 1 increases.

In the honeycomb filter 1 of the present embodiment shown in FIG. 2(a), the value of the ratio of the channel hydraulic diameter of the predetermined cell 3a having the large sectional area to the channel hydraulic diameter of the remaining cell 3b having the small sectional area is 1.2 or more. It is preferable that the value of the ratio of the channel hydraulic diameter is 1.3 or more and less than 2.0. When the value is smaller than 1.2, the honeycomb filter 1 easily closes by the PM.

In the honeycomb filter 1 of the present embodiment shown in FIG. 2(a), the sectional shape of the predetermined cell 3a having the large sectional area is a quadrangular shape whose portions P1 corresponding to four corner portions are circular. This circular shape is preferably a part of a perfect circular, but the shape may be elliptic or oblong, or may include another curved line. The shape is preferably smoothly connected to the portion corresponding to each side of the quadrangular shape. A size of the circular shape formed in the corresponding portion P1 corresponding to each corner portion may be equal or different. The size can be determined by a balance of a stress applied to the whole honeycomb filter.

In the honeycomb filter of the present embodiment, a porous material constituting the porous partition wall is not especially limited, but the partition wall preferably comprise the porous material composed of at least one selected from the group consisting of cordierite, silicon carbide, mullite, lithium aluminum silicate (LAS), and alumina which is a main component from viewpoints of strength, heat resistance, durability and the like. Here, the main component refers to a component contained in the whole material by 50 mass % or more. The component is contained further preferably by 70 mass % or more, and especially preferably by 80 mass % or more.

In the honeycomb filter of the present embodiment, a catalyst is preferably carried by the partition wall. Moreover, the catalyst is further preferably a catalyst which oxidizes PM. When carrying the catalyst, it is possible to promote oxidation/removal of the PM attached to the partition walls. Examples of the catalyst which oxidizes the PM include Pt, Rh, Ce and the like which belong a noble metal system.

In the honeycomb filter of the present embodiment, materials of plugging members forming the plugging portions 4, 5 shown in FIGS. 2(a), 2(b) are not especially limited, and the material preferably contains, as the main component, at least one selected from ceramics which are examples of the porous materials constituting the partition walls of the above-described honeycomb filter.

In the honeycomb filter of the present embodiment, the thickness of the partition wall is not especially limited. When the thickness of the partition wall is excessively large, the pressure loss during passing of the fluid sometimes increases. When the thickness is excessively small, the strength sometimes comes short. The thickness of the partition wall is preferably 100 to 1000 µm, further preferably 200 to 800 µm. The honeycomb filter of the present embodiment may have an outer peripheral wall position on an outermost periphery. It is to be noted that the outer peripheral wall is not limited to an integrally formed wall formed integrally with the honeycomb filter at a forming time, and may be a cement coat wall obtained by grinding and forming the outer periphery of the formed honeycomb filter into a predetermined shape, and forming the outer peripheral wall by cement or the like.

A pore diameter of the porous partition wall constituting the honeycomb filter of the present embodiment is not especially limited, and can be appropriately selected in accordance with application even by a person skilled in the art. In general, a pore diameter can be selected in accordance with viscosity of the fluid to be treated, such as exhaust gas, or an object to be separated. For example, when the honeycomb filter is used in DPF, an average value of the diameter is preferably set to about 1 to 100 µm.

Porosity of the porous partition wall constituting the honeycomb filter of the present embodiment is not especially limited. For example, when the honeycomb filter is used in the DPF, the porosity is preferably 20% or more, more preferably 40% or more, further preferably 60% or more. It is to be noted that the porosity means volume %, and is a value measured by a mercury porosimeter.

In the honeycomb filter of the present embodiment, a cell density is preferably 6 to 93 cells/cm$^2$, further preferably 10 to 78 cells/cm$^2$, further preferably 15 to 62 cells/cm$^2$.

Figure 3A:
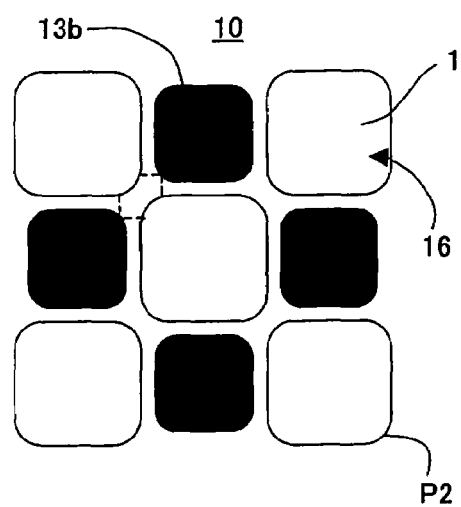
FIG. 3(a) is a plan view schematically showing one end face as viewed from one end portion side in another embodiment of the honeycomb filter of the present invention.

Another embodiment of the honeycomb filter of the present invention will be described next. FIG. 3(a) is a plan view schematically showing one end face 16 of a honeycomb filter 10 of the present embodiment as viewed from one end portion side, and FIG. 3(b) is a plan view schematically showing the other end face 17 as viewed from the other end portion side.

Figure 3B:
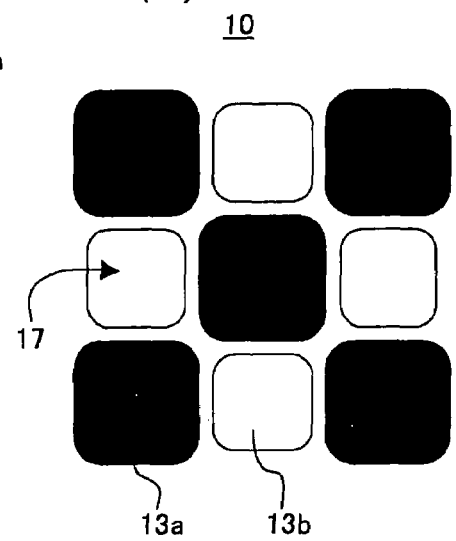
FIG. 3(b) is a plan view schematically showing the other end face as viewed from the other end portion side.

In the honeycomb filter of the present embodiment, as shown in FIGS. 3(a), 3(b), the sectional shape of a predetermined cell 13a which is a cell having a larger sectional area is a quadrangular shape whose portions corresponding to four corner portions are circular, and the sectional shape of a remaining cell 13b which is a cell having a smaller sectional area is also a quadrangular shape whose portions P2 corresponding to four corner portions are circular. Thus, the sectional shapes of all the cells are quadrangular shapes whose portions corresponding to four corner portions are circular. Therefore, portions on which stress is concentrated can further be reduced, and a honeycomb filter having a higher strength can be obtained.

Other constituting elements and conditions of the honeycomb filter 10 of the present embodiment are similar to those of one embodiment of the honeycomb filter of the present invention shown in FIGS. 2(a), 2(b).

Figure 4A:
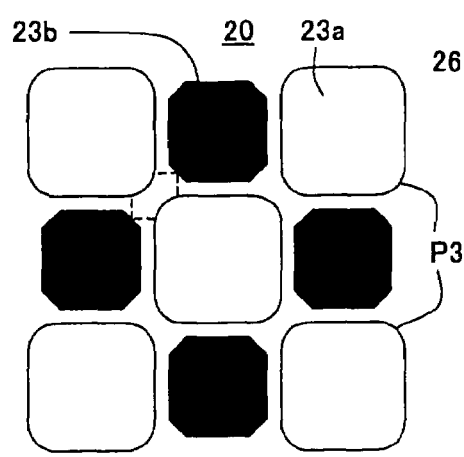
FIG. 4(a) is a plan view schematically showing one end face as viewed from one end portion side in still another embodiment of the honeycomb filter of the present invention.
Figure 4B:
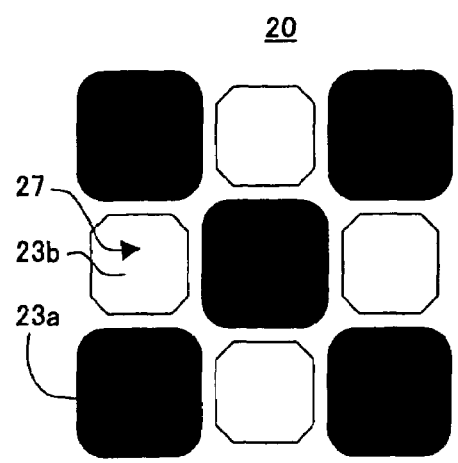
FIG. 4(b) is a plan view schematically showing the other end face as viewed from the other end portion side.

Moreover, FIGS. 4(a), 4(b) schematically show still another embodiment of a honeycomb filter of the present invention. FIG. 4(a) is a plan view schematically showing one end face 26 of a honeycomb filter 20 of the embodiment as viewed from one end portion side, and FIG. 4(b) is a plan view schematically showing the other end face 27 as viewed from the other end portion side.

In the honeycomb filter 20 of the present embodiment, as shown in FIGS. 4(a), 4(b), a sectional shape of a predetermined cell 23a which is a cell having a larger sectional area is a quadrangular shape whose portions P3 corresponding to four corner portions are circular. A sectional shape of a remaining cell 23b which is a cell having a smaller sectional area is an octagonal shape whose portions corresponding to four corner portions of a quadrangular shape are linearly cut. Thus, the sectional shape of the remaining cell 23b which is the cell having the smaller sectional area is the octagonal shape. Therefore, as compared with the honeycomb filter of one embodiment of the present invention shown in FIGS. 2(a), 2(b), a degree of stress concentration can be decreased, and the honeycomb filter 20 having a higher strength can be obtained.

Other constituting elements and conditions of the honeycomb filter 20 of the present embodiment are similar to those of one embodiment of the honeycomb filter of the present invention shown in FIGS. 2(a), 2(b).

Next, a method of manufacturing a honeycomb filter according to one embodiment of the present invention will be described. The honeycomb filter of the present embodiment can be manufactured, for example, by the following method, and the method of manufacturing the honeycomb filter of the present embodiment is not limited to the following method.

First, clay which is a raw material of the honeycomb filter is prepared. Preferable examples are used as raw materials of partition walls of the above-described honeycomb filter, and the raw materials are kneaded to thereby form the clay. For example, a pore former is added to silica, kaolin, talc, and alumina which are cordierite materials, further a binder, dispersant, and water are added, and the material is kneaded to thereby form the clay. The pore former may have a property of disappearing in a firing step, and a polymeric compound of a carbon inorganic material or a plastic material, an organic material such as starch and the like may be used alone or in a combined manner. The clay obtained in this manner is extruded and formed into a honeycomb formed article using a honeycomb structure extruding/forming die including slits having predetermined shapes. At this time, the extruding/forming die is structured in such a manner that, as shown in FIG. 2(a), a portion corresponding to the predetermined cell 3a having a large sectional area is a quadrangular shape whose portions corresponding to four corner portions are circular, and a portion corresponding to the remaining cell 3b having the small sectional area has a usual quadrangular shape.

Next, the obtained honeycomb formed article is dried. As drying means, various methods may be performed.

Next, opposite end faces of the dried honeycomb formed article are cut into predetermined lengths.

Next, predetermined cells in the end face of the dried honeycomb formed article are plugged, and, as shown in FIGS. 3(a), 3(b), plugging portions and openings are alternately arranged in the respective end faces to form a checked pattern.

Thereafter, when the article is fired, a cordierite honeycomb filter can be formed.

Next, one embodiment of an exhaust gas treatment apparatus of the present invention will be described. The exhaust gas treatment apparatus of the present embodiment comprises: the above-described honeycomb filter of the present invention; and a holding portion for disposing the honeycomb filter of the present invention in such a manner that exhaust gas flows in from the end portion on a side on which the cell having a large sectional area opens.

For example, when the above-described honeycomb filter shown in FIGS. 2(a), 2(b) is used, the honeycomb filter is held by the holding portion in such a manner as to the exhaust gas flows in from the opening 9a of the predetermined cell 3a that is the cell having the large sectional area, and the exhaust gas is filtered by the partition walls 2a of the honeycomb filter, and discharged as the passed fluid from the opening 9b of the remaining cell 3b that is the cell having the small sectional area.

Thus, the exhaust gas flows in from the end portion on the side on which the cell having the large sectional area opens, and this can inhibit the PM from being deposited in the opening on the side on which the exhaust gas flows in, and inhibit the opening from being closed.

The exhaust gas treatment apparatus of the present embodiment is installed in a channel of an exhaust system of exhaust gas. Moreover, the shape of the holding portion of the exhaust gas treatment apparatus of the present embodiment is not especially limited, and may be cylindrical or a cylinder shape having a polygonal section. As a material of the holding portion, stainless steel or the like is preferable from viewpoints such as strength, durability, anti-corrosion and the like. A heat-resistant cushion material or the like is preferably disposed inside a holding member in such a manner as to the honeycomb filter can be held without being broken.

Thus, according to the exhaust gas treatment apparatus of the present embodiment, the exhaust gas is passed into the end portion of the above-described honeycomb filter of the present invention on the side on which the cells having large sectional areas open. Therefore, the cells which open in the end portion of the honeycomb filter on a fluid inflow side can be inhibited from being closed by particulates and the like. Moreover, the high strength of the honeycomb filter can be maintained.

EXAMPLES

The present invention will be described hereinafter more concretely in accordance with examples, but the present invention is not limited to the examples.

Examples 1 to 6, Comparative Examples 1 to 10

First, talc, kaolin, alumina, and silica adjusted in such a manner as to form cordierite after fired as a sample were blended, a pore former, binder, surfactant, and mixed water were added to the sample, and mixing/kneading was performed. When extruding/forming was performed, a honeycomb formed article was obtained. At an extruding/forming time, a die prepared beforehand in consideration of shrinkage or the like by drying and firing was prepared and used in each test standard. After drying a honeycomb structure, the same materials were used, and opposite end faces were plugged in such a manner as to obtain a checkered pattern. This structure was fired, and the sample of a honeycomb filter of each test standard was obtained.

As cell structures of the honeycomb filters, two types were obtained: a cell structure having a partition wall thickness (web thickness) of 12 mil (0.3 mm) and a cell density (cell number) of 300 cpsi (46.5 cells/cm$^2$); and a cell structure having a partition wall thickness (web thickness) of 17 mil (0.43 mm) and a cell density (cell number) of 100 cpsi (15.5 cells/cm$^2$) (see Table 1). Moreover, with respect to the honeycomb filters of examples and comparative examples, Table 1 shows values of channel hydraulic diameters (large and small diameters) of the cells having large and small sectional areas, and values (large diameter/small diameter ratios) of ratios of large diameters with respect to small diameters. All corner portions of the cell having the large sectional area are circular (R-shaped), and all corner portions of the cell having the small sectional area have right angles. Furthermore, Table 1 shows minimum thickness of an intersection portion of a partition wall of each of the respective examples and comparative examples, partition wall thickness, and a value (intersection portion thickness ratio) of a ratio of the minimum thickness of the intersection portion with respect to the thickness of the partition wall.

Each obtained sample of the honeycomb filter was attached to a diesel engine, and a pressure loss at a PM deposition time was measured. The sample was coated with a predetermined amount of catalyst. After a certain amount of PM was deposited, PM regeneration by post injection was performed. A cycle of the PM depositing and regenerating was performed by a defined cycle (test cycle) (see Table 1), and a closed state (plugging) of the end face was confirmed. The ratio of the cells whose cell openings were completely closed with respect to all cells opening on an exhaust gas inflow side was 30% or more. In this case, "NG" was judged. When the ratio did not reach this degree, "OK" was judged. As the measurement of strength of the honeycomb filter, isostatic strength measurement was performed.

Isostatic strength of each honeycomb filter was measured as follows:

Firstly, both sides of the honeycomb filter were covered with a metal plate having the same diameter as that of the honeycomb filter, the metal plates were secured with a rubber tube having the same diameter as that of the honeycomb filter, and a rubber tape was applied to and around the rubber tubes to seal the filter against entry of water. Then, the thus sealed honeycomb filter was immersed in water, a water pressure was raised until the filter was broken, and isostatic strength (MPa) was evaluated based on the water pressure at which the filter was broken. Results are shown in Table 1.

TABLE 1

| | Web thickness (mil) | Cell number (cpsi) | Large/small diameter ratio | Large diameter (mm) | Small diameter (mm) | Web thickness (mm) | Minimum thickness (mm) | Intersection portion thickness ratio | Pressure loss (kPa) | Plugging | Test cycle (cycle) | Isostatic strength (MPa) |
|---|---|---|---|---|---|---|---|---|---|---|---|---|
| Example 1 | 12 | 300 | 1.22 | 1.277 | 1.045 | 0.305 | 0.299 | 0.980 | 4.5 | OK | 50 | 2.34 |
| Example 2 | 12 | 300 | 1.22 | 1.277 | 1.045 | 0.305 | 0.373 | 1.223 | 4.7 | OK | 50 | 2.46 |
| Example 3 | 12 | 300 | 1.50 | 1.393 | 0.929 | 0.305 | 0.218 | 0.716 | 4.3 | OK | 50 | 2.12 |
| Example 4 | 17 | 100 | 1.22 | 2.319 | 1.897 | 0.432 | 0.370 | 0.858 | 11.3 | OK | 100 | 2.14 |
| Example 5 | 17 | 100 | 1.22 | 2.319 | 1.897 | 0.432 | 0.505 | 1.169 | 11.6 | OK | 100 | 2.28 |
| Example 6 | 17 | 100 | 1.35 | 2.424 | 1.792 | 0.432 | 0.365 | 0.844 | 11 | OK | 100 | 2.12 |
| Comparative Example 1 | 12 | 300 | 1.00 | 1.161 | 1.161 | 0.305 | 0.431 | 1.414 | 5.2 | NG | 50 | 2.50 |
| Comparative Example 2 | 12 | 300 | 1.22 | 1.277 | 1.045 | 0.305 | 0.479 | 1.570 | 5.1 | OK | 50 | 2.84 |
| Comparative Example 3 | 12 | 300 | 1.00 | 1.161 | 1.161 | 0.305 | 0.431 | 1.414 | 5.2 | NG | 50 | 2.65 |
| Comparative Example 4 | 12 | 300 | 1.11 | 1.219 | 1.103 | 0.305 | 0.450 | 1.476 | 5.1 | NG | 50 | 2.56 |
| Comparative Example 5 | 12 | 300 | 1.67 | 1.451 | 0.871 | 0.305 | 0.141 | 0.463 | 4.2 | OK | 50 | 1.79 |
| Comparative Example 6 | 17 | 100 | 1.00 | 2.108 | 2.108 | 0.432 | 0.611 | 1.414 | 12.7 | NG | 100 | 2.28 |
| Comparative Example 7 | 17 | 100 | 1.22 | 2.319 | 1.897 | 0.432 | 0.697 | 1.613 | 12.2 | OK | 100 | 2.62 |
| Comparative Example 8 | 17 | 100 | 1.00 | 2.108 | 2.108 | 0.432 | 0.611 | 1.414 | 12.7 | NG | 100 | 2.41 |
| Comparative Example 9 | 17 | 100 | 1.11 | 2.213 | 2.003 | 0.432 | 0.645 | 1.494 | 12.4 | NG | 100 | 2.34 |
| Comparative Example 10 | 17 | 100 | 1.50 | 2.530 | 1.686 | 0.432 | 0.224 | 0.519 | 10.3 | OK | 100 | 1.85 |

The PM closing occurs in the end face with respect to a structure in which a large/small diameter ratio is smaller than 1.2. On the other hand, when the ratio is 1.2 or more, the structure is satisfactory without any PM closing. When a value (intersection portion thickness ratio) of a ratio of an intersection portion minimum web thickness to a web thickness is smaller than 0.7, the isostatic strength is unfavorably lower than that of a quadrangular cell shape. When the value is 0.7 or more, the isostatic strength is preferably higher than that of the quadrangular cell. Since the corner portion is formed into an R shape, any stress is not concentrated, and is scattered. This is supposedly why a satisfactory result is obtained. When the value is 1.3 or more, PM deposition pressure loss is high. In this case, a cell numerical aperture is lowered, and it is supposed that the pressure loss rises.

As described above, the value or the ratio of the channel hydraulic diameter of the cell having the large sectional area with respect to that of the cell having the small sectional area is 1.2 or more. The corner portion of at least the large cell has the R shape. The value of the ratio of the minimum web thickness of the intersection portion with respect to the web thickness is 0.7 or more and less than 1.3. This filter is an effective filter which is superior in pressure loss, PM closing of the end face, and strength.

A honeycomb filter and exhaust gas treatment apparatus of the present invention can be utilized in removing particulates or toxic materials from an exhaust gas of an internal combustion engine, boiler or the like. A superior effect is obtained especially in removing particulates discharged from a diesel engine.

What is claimed is:

1. A honeycomb filter comprising:
    porous partition walls which partition/form a plurality of cells constituting channels of a fluid,
    a predetermined cell whose one end portion is opened and whose other end portion is plugged, and
    a remaining cell whose one end portion is plugged and whose other end portion is opened,
    the predetermined cell and the remaining cell being alternately arranged, and
    the honeycomb filter being capable of allowing the fluid that has flowed in from the one end portion in which the predetermined cell opens to flow out as a passed fluid into the remaining cell through the partition walls, and discharging the passed fluid from the other end portion in which the remaining cell opens,
    wherein a sectional area of the predetermined cell is different from that of the remaining cell in a section cut along a flat face vertical to a longitudinal direction of the cell, a value of a ratio of a channel hydraulic diameter of the cell having a large sectional area to that of the cell having a small sectional area is from 1.2 to 1.5, at least a sectional shape of the cell having the large sectional area is a quadrangular shape whose portion corresponding to at least one corner portion is circular, and a value of a ratio of minimum thickness of a portion (intersection portion) in which the partition walls cross one another to a thickness of each partition wall is 0.7 or more and less than 1.3.

2. The honeycomb filter according to claim 1, wherein the porous partition wall comprises a porous material composed of at least one selected from the group consisting of cordierite, silicon carbide, mullite, LAS, and alumina, as a main component.

3. The honeycomb filter according to claim 1, wherein the partition wall carries a catalyst.

4. An exhaust gas treatment apparatus comprising:
    a honeycomb filter comprising, porous partition walls which partition/form a plurality of cells constituting channels of a fluid, a predetermined cell whose one end portion is opened and whose other end portion is plugged, and a remaining cell whose one end portion is plugged and whose other end portion is opened, the predetermined cell and the remaining cell being alternately arranged, and the honeycomb filter being capable of allowing the fluid that has flowed in from the one end portion in which the predetermined cell opens to flow out as a passed fluid into the remaining cell through the partition walls, and discharging the passed fluid from the other end portion in which the remaining cell opens, wherein a sectional area of the predetermined cell is different from that of the remaining cell in a section cut along a flat face vertical to a longitudinal direction of the cell, a value of a ratio of a channel hydraulic diameter of the cell having a large sectional area to that of the cell having a small sectional area is from 1.2 to 1.5, at least a sectional shape of the cell having the large sectional area is a quadrangular shape whose portion corresponding to at least one corner portion is circular, and a value of a ratio of minimum thickness of a portion (intersection portion) in which the partition walls cross one another to a thickness of each partition wall is 0.7 or more and less than 1.3; and
    a holding portion for disposing the honeycomb filter in such a manner that exhaust gas flows in from the end portion on the side on which the cell having the large sectional area opens.

5. The exhaust gas treatment apparatus according to claim 4, wherein the porous partition wall comprises a porous material composed of at least one selected from the group consisting of cordierite, silicon carbide, mullite, LAS, and alumina, as a main component.

6. The exhaust gas treatment apparatus according to claim 4, wherein the partition wall carries a catalyst.

* * * * *